US009117306B2

(12) United States Patent
Bakalash

(10) Patent No.: US 9,117,306 B2
(45) Date of Patent: Aug. 25, 2015

(54) METHOD OF STENCIL MAPPED SHADOWING

(71) Applicant: Reuven Bakalash, Shdema (IL)

(72) Inventor: Reuven Bakalash, Shdema (IL)

(73) Assignee: ADSHIR LTD., Shdema (IL)

( * ) Notice: Subject to any disclaimer, the term of this patent is extended or adjusted under 35 U.S.C. 154(b) by 0 days.

(21) Appl. No.: 14/479,334

(22) Filed: Sep. 7, 2014

(65) Prior Publication Data

US 2014/0375644 A1    Dec. 25, 2014

Related U.S. Application Data

(63) Continuation-in-part of application No. 13/726,763, filed on Dec. 26, 2012, now Pat. No. 8,957,902.

(60) Provisional application No. 61/894,005, filed on Oct. 22, 2013.

(51) Int. Cl.
*G06T 15/06* (2011.01)
*G06T 15/60* (2006.01)
*G06F 9/50* (2006.01)
*G06F 12/08* (2006.01)

(52) U.S. Cl.
CPC .............. *G06T 15/06* (2013.01); *G06F 9/5061* (2013.01); *G06F 12/0875* (2013.01); *G06T 15/60* (2013.01); *G06F 12/0806* (2013.01); *G06F 2209/502* (2013.01); *G06F 2212/2542* (2013.01); *G06T 2210/52* (2013.01)

(58) Field of Classification Search
CPC ......... G06T 15/06; G06T 15/50; G06T 15/60; G06T 2210/52; G06F 12/0875; G06F 9/5061; G06F 12/0806; G06F 2209/502; G06F 2212/2542
USPC .................................................. 345/424, 426
See application file for complete search history.

(56) References Cited

U.S. PATENT DOCUMENTS

| | | | | |
|---|---|---|---|---|
| 2002/0047843 | A1* | 4/2002 | Higashiyama et al. | 345/426 |
| 2005/0206647 | A1* | 9/2005 | Xu et al. | 345/536 |
| 2008/0180440 | A1* | 7/2008 | Stich | 345/426 |
| 2011/0141112 | A1* | 6/2011 | Hux et al. | 345/426 |
| 2011/0234583 | A1* | 9/2011 | Bakalash | 345/419 |

OTHER PUBLICATIONS

Kim, "Real Time Shadow of Transparent Casters Using Shadow Volume", Georgia Institute of Technology, 2007, pp. 1-3.*

* cited by examiner

*Primary Examiner* — Maurice L McDowell, Jr.

(57) ABSTRACT

Aspects comprise shadowing method as part of ray tracing. It is based on uniform grid of cells, and on local stencils in cells. The acceleration structures are abandoned along with high traversal and construction costs of these structures. The amount of intersection tests is cut down. The stencils are generated in the preprocessing stage and utilized in runtime. The relevant part of scene data, critical for shadowing of all visible intersection points in a cell, is registered in the local stencil map, as a volumetric data. The runtime use of stencils allows a complete locality at each cell, enhanced utilization of processing resources and load balancing of parallel processing.

18 Claims, 14 Drawing Sheets

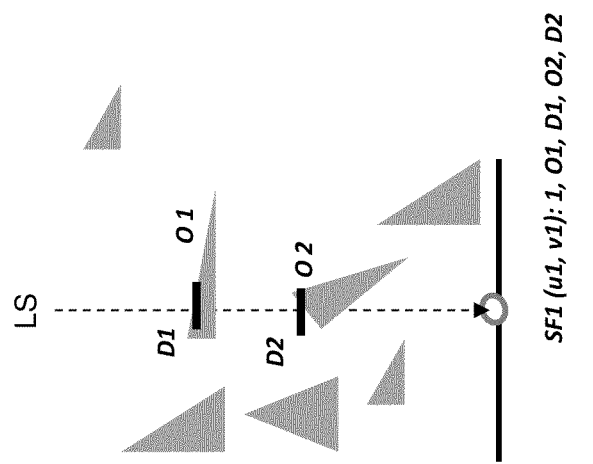
Fig. 2. Stencil fragment (SF) as part of a stencil map

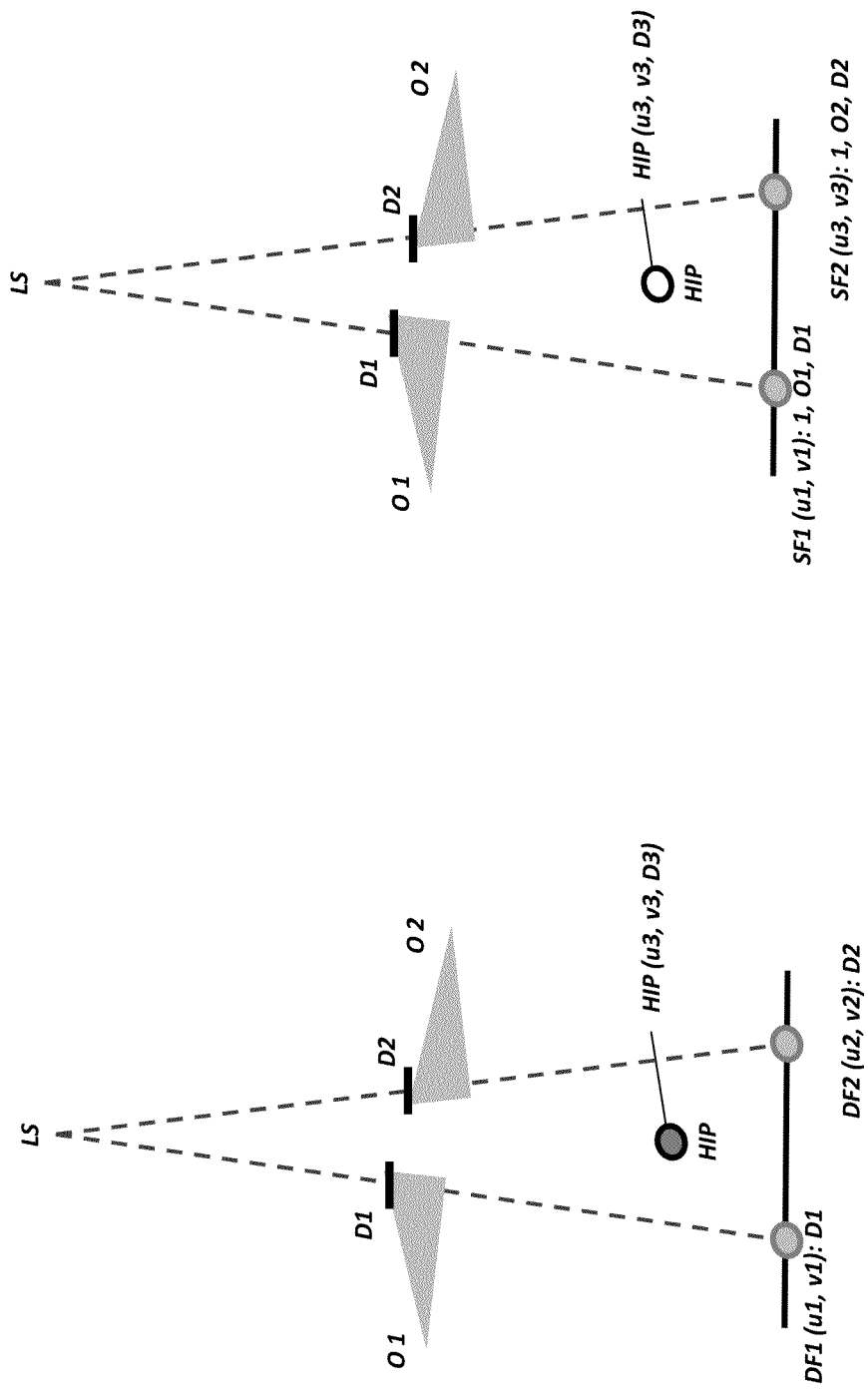
Fig. 3B. Stencil map.
Fig. 3A. Depth map.

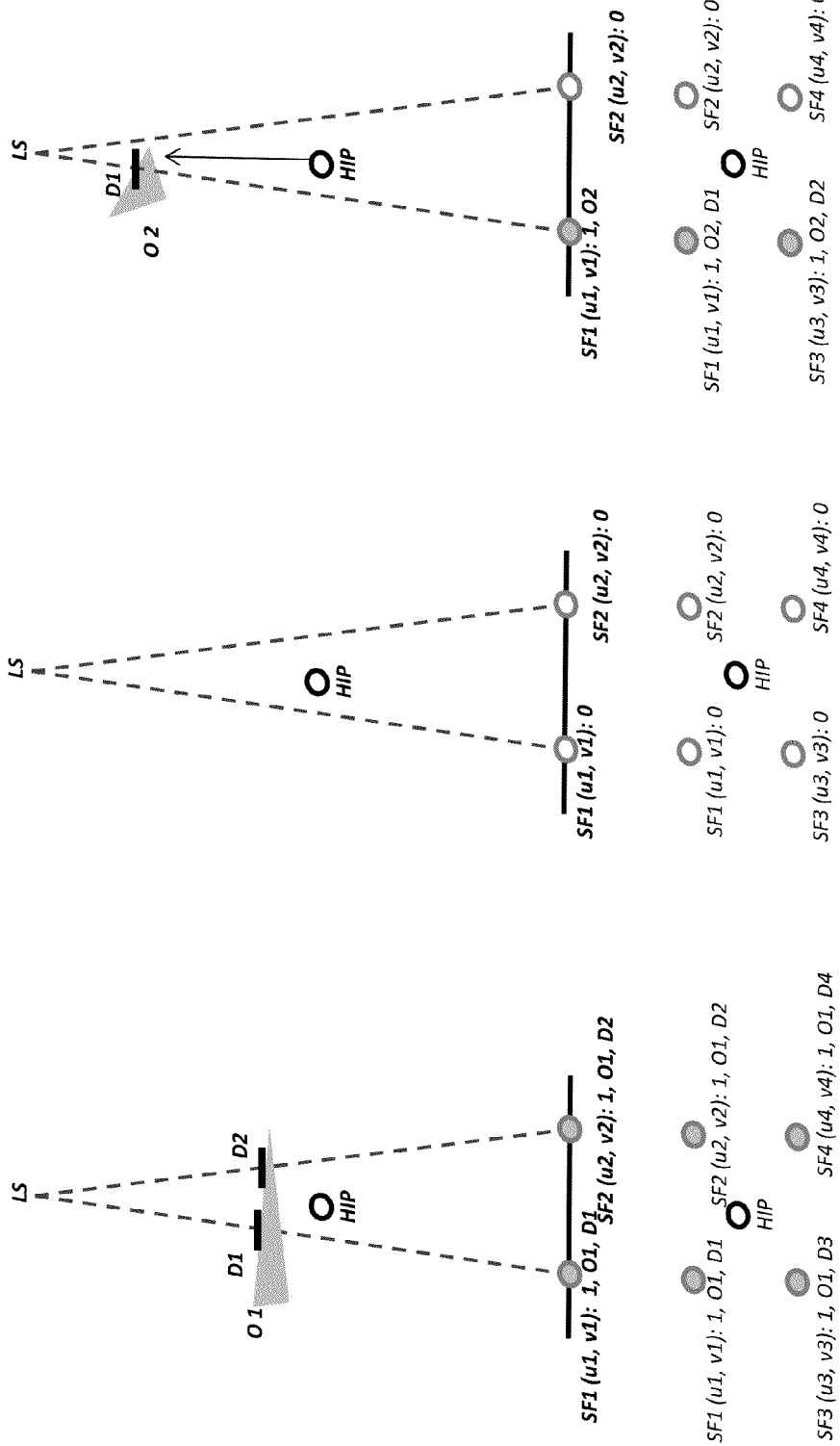

Similar ambiguous case.
Shadowed. Needs
intersection test.

Ambiguous case. Non
shadowed. Needs
intersection test.

METHOD OF STENCIL MAPPED SHADOWING

CROSS-REFERENCE TO RELATED CASES

The present application claims priority based on U.S. Provisional Application No. 61/894,144 filed Oct. 22, 2013 entitled "Ray Shadowing Method Utilizing Geometrical Stencils"; and is a Continuation-In-Part of the U.S. application Ser. No. 13/726,763 filed Dec. 26, 2012 entitled "Method and Apparatus for Interprocessor Communication Employing Modular Space Division"; all of which are hereby incorporated by reference.

FIELD OF THE INVENTION

The present invention relates generally to solving data-parallel processing and, more particularly, to data-parallel ray tracing technology enabling real time applications and highly photo-realistic images.

BACKGROUND OF THE INVENTION

Ray-tracing is a technique for generating images by simulating the behavior of light within a three-dimensional scene by typically tracing light rays from the camera into the scene, as depicted in FIG. 1A. In general two types of rays are used. The ray that comes from the screen or viewer's eye (aka point of view) is called the primary ray. Tracing and processing the primary ray is called primary ray shooting, or just ray shooting. If the primary ray hits an object, at the primary point of intersection, the light may bounce from the surface of the object. We call these rays secondary rays. Primary rays are traced from a particular point on the camera image plane (a pixel) into the scene, until they hit a surface, at a so-called hit or primary intersection point. Shadow rays and secondary rays are traced from a hit point to determine how it is lit. The origin of a shadow ray is on the surface of an object and it is directed towards the light sources. If the ray hits any object before it reaches any light source, the point located at the ray origin is in the shadow and should be assigned a dark color. Processing the shadow ray is called shadowing. Finally, to determine how the surface material appears texture lookups and shading computations are performed at or near the hit point. FIG. 1B shows a scene having three objects and a single light source. Three ray generations are created when the primary ray spawns other rays (N' surface normal, R' reflected ray, L' shadow ray, T' transmitted (refracted) ray).

Ray tracing is a high computationally expensive algorithm. Fortunately, ray tracing is quite easy to parallelize. The contribution of each ray to the final image can be computed independently from the other rays. For this reason, there has been a lot of effort put into finding the best parallel decomposition for ray tracing. There are two main approaches in prior art to the parallel ray-tracing: (i) ray-parallel, in which rays are distributed among parallel processors, while each processor traces a ray all the way, and (ii) data-parallel, in which the scene is distributed among multiple processors, while a ray is handled by multiple processors in a row.

The ray-parallel implementation of ray tracing would simply replicate all the data with each processor and subdivide the screen into a number of disjoint regions. Each processor then renders a number of regions using the unaltered sequential version of the ray tracing algorithm, until the whole image is completed. Whenever a processor finishes a region, it asks the master processor for a new task. This is also called the demand driven approach, or an image space subdivision. Load balancing is achieved dynamically by sending new tasks to processors that have just become idle. However, if a very large models need to be rendered, the scene data have to be distributed over the memories, because the local memory of each processor is not large enough to hold the entire scene. Then demand driven approach suffers from massive copies and multiplications of geometric data.

Data-parallel is a different approach to rendering scenes that do not fit into a single processor's memory. Here, the object data is distributed over the processors. Each processor owns only a subset of the database and it traces rays only when they pass through its own subspace. Its high data locality excludes massive moves of data, answering the needs of very large models. However, rendering cost per ray and the number of rays passing through each subset of database are likely to vary (e.g. hot spots are caused by viewpoints and light sources), leading to severe load imbalances, a problem which is difficult to solve either with static or dynamic load balancing schemes. Efficiency thus tends to be low in such systems.

In order to exploit locality between data accesses as much as possible, usually some spatial subdivision is used to decide which parts of the scene are stored with which processor. In its simplest form, the data is distributed according to a uniform distribution. Each processor will hold one or more equal sized voxels. Having just one voxel per processor allows the data decomposition to be nicely mapped onto a 3D grid topology. However, since the number of objects may vary dramatically from voxel to voxel, the cost of tracing a ray through each of these voxels will vary and therefore this approach may lead to severe load imbalances.

The way the data is distributed over processors has a strong impact on how well the system performs. The more even the workload associated with a particular data distribution, the less idle time is to be expected. Three main criteria need to be observed for such distributions to lead to efficient execution of the parallel algorithm (Salmon and Goldsmith): (i) The memory overhead for each processor should be as equal as possible. (ii) Communication requirements during rendering need to be minimized. (iii) Processing time for each processor needs to be equalized.

Generating data distributions which adhere to all three criteria is a difficult problem, which remains unsolved in prior art. Most data distributions are limited to equalizing the memory overhead for each processor. This is a relatively simple exercise, because generating an adaptive spatial subdivision, such as an octree or KD-tree, gives sufficient clues as to which regions of space contain how many objects.

Another problem in ray tracing is the high processing cost of acceleration structures. For each frame, a rendering system must find the intersection points between many rays and many polygons. The cost of testing each ray against each polygon is prohibitive, so such systems typically use accelerating structures (such as Octree, KD-tree, other binary trees, bounding boxes, etc.) to reduce the number of ray/polygon intersection tests that must be performed. As the data is sorted over space with the acceleration structure, the data distribution over the processors is based on this structure as well. The spatial subdivision is also used to establish which data needs to be fetched from other processors. Moreover, construction of optimized structures is expensive and does not allow for rebuilding the accelerating structure every frame to support for interactive ray-tracing of large dynamic scenes. The construction times for larger scenes are very high and do not allow dynamic changes.

There has been an attempt in the prior art to lower the cost and complexity of acceleration structures by using its simplest form, where the data is distributed uniformly. Each processor will hold one or more equal sized voxels. Having just one voxel per processor allows the data decomposition to be nicely mapped onto a 3D grid topology. However, since the number of objects may vary dramatically from voxel to voxel, the cost of tracing a ray through each of these voxels will vary and therefore this approach leads to severe load imbalances, and consequently the uniform distribution has been abandoned.

Today, the most popular data structure in the prior art is the KD-tree. Ray traversal in a KD-tree is particularly efficient for scenes with non-uniform distribution of objects. The massive traversal of accelerating structures based on the KD-tree typically consumes a major chunk of the frame time. The ray-object intersection tests of prior art are considered as the heaviest part of ray tracing due to extensive traversal across the accelerating data structures and massive memory access. Thus, there is a great need in the art to devise a method of improved load balancing, reduced traversals leaned on simple data structure, and reduced amount of intersection tests.

The main cause for the ray tracing computational burden is the necessity to test for intersection between millions of rays and millions of objects. Intersection tests are of high computational complexity and associated with massive data transfers. The prior art ray tracing technologies concentrate on speeding up these tests and lowering the cost of intersections. Beside lowering the performance, intersection tests greatly affect the power consumption. The high power consumption of prior art ray tracing has a prohibitive effect of applying this technology on handheld devices such as laptops, tablets, Smartphones, etc., which are battery powered.

SUMMARY

Prior art shadowing, being based on huge acceleration structures, suffers of high construction cost and traversal costs of such structures, and millions of expensive intersection tests. Our shadowing, based on stencils, eliminates the use of acceleration structures and cuts off the majority of intersection tests. The scene is structured of a uniform grid of cells. The relevant part of scene data, critical for shadowing of all visible intersection points in a cell, is registered in the local stencil map, as a volumetric data. Due to these stencils, a complete locality of processing and locality of data in each cell are achieved.

Our ray tracing method is efficiently mapped on off-the-shelf architectures, such as multicore CPU chips with or without integrated GPUs, discrete GPUs, distributed memory parallel systems, shared memory parallel system, networks of discrete CPUs, PC-level computers, information server computers, cloud server computers, laptops, portable processing systems, tablets, Smartphones, and essentially any computational-based machine. There is no need for special purpose hardware.

The above summary is not exhaustive. The invention includes all systems and methods that can be practiced from all suitable combinations and derivatives of its various aspects summarized above, as well as those disclosed in the detailed description below and particularly pointed out in the claims filed with the application. Such combinations have particular advantages not specifically recited in the above summary.

BRIEF DESCRIPTION OF DRAWINGS

The invention is herein described, by way of non-limiting examples, with reference to the accompanying figures and drawings, wherein like designations denote like elements. Understanding that these drawings only provide information concerning typical embodiments and are not therefore to be considered limiting in scope:

FIG. 2. One stencil fragment of a stencil map, caching light blocking objects.

FIG. 3A. Prior art depth map. The shadow status of visible intersection points is made up based only on the known depth values, which are registered at DF1 and DF2. As a result, the HIP shadow status, based on these values is erroneously interpreted as 'shadowed'.

FIG. 3B. Stencil map. The shadow status of HIP is calculated based on a complete information of all possibly obstructing objects. The list of objects is registered at SF1 and SF2. Generally, the shadow status of HIP is always described correctly.

FIG. 5A. A case setup in which HIP is found shadowed, without intersection test

FIG. 5B. A case setup in which HIP is found not shadowed, without intersection test FIG. 5C. A case setup in which intersection test is required.

DETAILED DESCRIPTION OF THE INVENTION

Figure 1A:
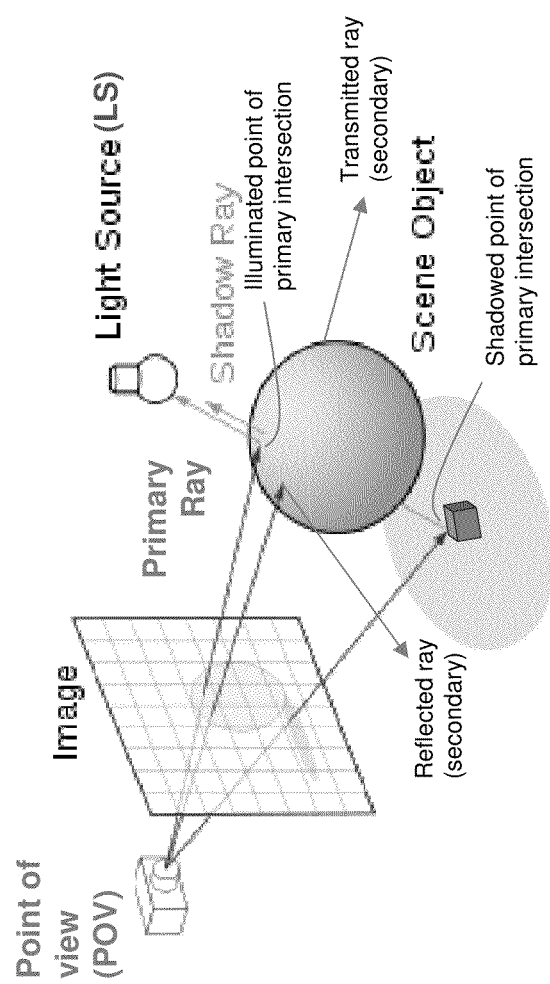
FIG. 1A. Prior art. The figure illustrates a setup of a ray-traced scene including view point, image and scene object. Reflection, refraction, and shadow rays are spawned from a point of intersection between primary ray and scene object.
Figure 1B:
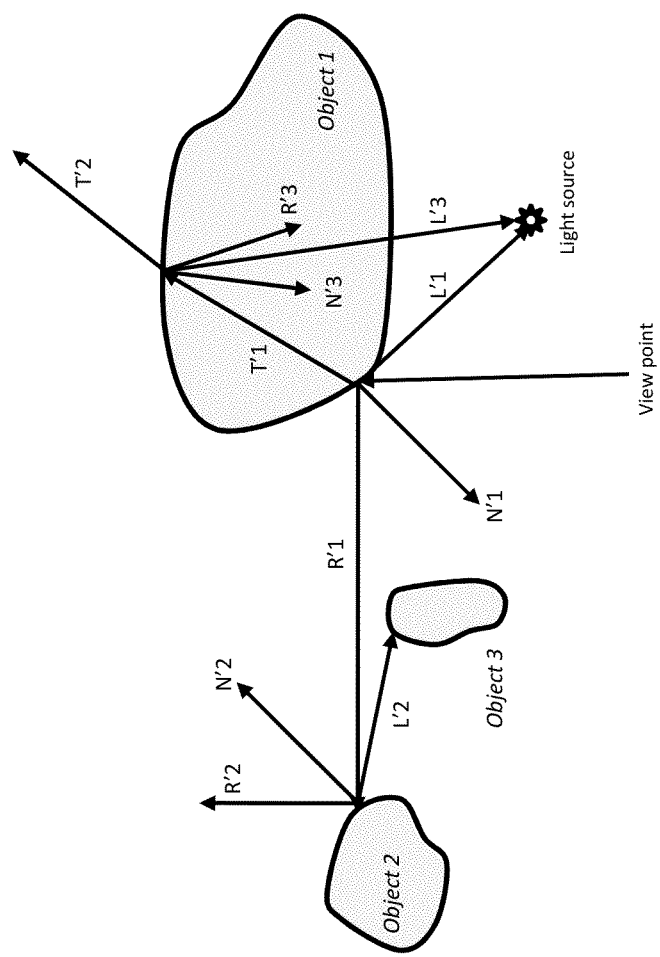
FIG. 1B. Prior art. Another setup of a ray traveling across the scene is shown, having three objects and single light source. Three ray generations are created when the primary ray spawns other rays. Terms include N' surface normal, R' reflected ray, L' shadow ray, T' transmitted (refracted) ray.

Shadowing in ray tracing is heavy because of the need to process each hit point (HIP) multiple times, according to the number of light sources in a scene. The prior art shadowing, being based on huge acceleration structures, suffers of high construction and traversal costs of these structures, and of many expensive intersection tests. Our shadowing, based on stencils, do not use acceleration structures and cuts off the majority of intersection tests. The scene is structured of a uniform grid of cells. The relevant part of scene data, critical for shadowing of all visible intersection points in a cell, is cached in the local stencil map. Due to these stencils a complete locality of processing and locality of data in each cell are achieved.

The shadowing of present invention is characterized by two advantages: (i) the amount of intersection tests is drastically cut down, and (ii) tracing a ray is not sequential any more, but indifferent of any order. Enhancing the locality is based on providing locally at a cell all the information concerning the potentially obstructing objects, between the cell and the light source (LS). This information, stored once in a raster based stencil, replaces multiple reachouts from HIPs to LS. The stencil is compiled in a preprocessing stage. It is stored locally in a cell, easily and independently accessible by the assigned processor. The shadowing decision per each hit point (HIP) is then done locally by consulting the stencil.

We define stencil in a 3D related processes (such as ray tracing), as a means for caching a relevant piece of information in a cell, extracted from the global data (e.g. scene data), or alternatively caching the cell relevant information elsewhere, in a directly accessible way to each cell. As a result, the processing in a cell becomes completely local, independently of other cells and free of restrains of the working order among cells, greatly contributing to a well balanced parallel processing.

For shadowing, the information to be extracted from the scene data and stored in stencils are occluding objects that block the light between the light source and the cell. Therefore, the stencil cached information must be associated with an occluding data.

The use of stencils for shadowing of HIPs created by primary shooting stage is based on locally stored information in regard to the data between HIPs and light source (LS). This data, comprising all candidate objects to cast shadow on HIPs, is held as a stencil map.

The stencil map defined here is fundamentally different from the prior art's depth map. In 3D raster graphics a depth map is an image that contains information relating to the distance of the closest surface of scene objects viewed from a viewpoint. The term is related to, and may be analogous to the depth buffer, Z-buffer, Z-buffering and Z-Depth. The "Z" in these latter terms relates to a convention that the central axis of view of a camera is in the direction of the camera's Z axis, and not to the absolute Z axis of a scene. Depth maps, used in shadow mapping to create shadows cast by illumination, are calculated from the perspective of the lights, recording the first surface seen. They cannot convey multiple distances where they occur within the view of a single pixel.

In contrast to prior art's surface based depth maps, our stencil map is a volumetric map that contains information relating to the volume from the perspective of the light source recording multiple objects and their distances where they occur within the view of a single fragment. As such, it can convey any complete volumetric data. Generally speaking, stencil map is a volumetric entity, in contrast to the prior art's depth map which is a surface based entity.

FIG. 2 illustrates the registering concept of volumetric data in a stencil map. One stencil fragment (SF) of a map is shown. Out of all scene objects, there is a relevant subset required to solve for shadowing: objects that intercept the illuminating ray all the way from the light source (LS) to SF. Two intercepting objects are shown, $O_1$ and $O_2$. They interrupt the ray at surface points having the depth $D_1$ and $D_2$ respectively. Generally, this information is registered in a fragment as SF (u, v): B, $O_1$, $D_1$ ... $O_n$, $D_n$.

U, v are the coordinates of the fragment in a light source coordinate system (or alternatively, in a scene coordinate system). B stands for a light blocking factor, B=0 for unshadowed and B=0 for shadowed fragment. O is object's ID, which may be recorded by indices, to save memory, or in full. D is the ray's hit point on the object's surface in terms of the distance from LS. In the illustrated case the cached data is: $SF_1$ ($u_1$, $v_1$): 1, $O_1$, $D_1$, O2, D2, meaning that the fragment is shadowed, and two objects O1 and O2 block the light, at distances $D_1$ and $D_2$ respectively.

FIGS. 3A and 3B exemplify the difference between our stencil and prior art's depth map, as for creating shadows in ray tracing. FIG. 3A shows an effort to use prior art's depth map for shadowing HIPs. The shadow status of HIP is made up based on the depth values registered in depth fragments DF1 and DF2 of depth map. The values registered in a depth fragment (DF) are the fragment coordinates, and depth D of the first surface seen from light source: DF (u1, v1): D. In this example the HIP should be actually illuminated, but due to lack of volumetric information that the the fragments are obscured by two different objects O1 and O2, the HIP would erroneously be taken for 'shadowed'. This is a case of uncertainty, but a surface based depth map used for shadowing is non sensitive for such uncertainties, prohibiting the use of depth maps in ray tracing shadowing. FIG. 3B shows a volumetric stencil map. The shadow stencils are generated in a preprocessing stage prior the shadowing run time. A shadow stencil accrues the visibility of objects as it is seen from the light source (LS). This visibility data is registered as a raster of fragments. The volumetric information recorded in stencil fragments SF1 and SF2, during preprocessing, is utilized for shadowing the HIPs in run time. The SF information comprises the fragment's coordinates, and a list of all occluding objects along the way from HIP to LS. In this case the shadowed status of the HIP must be determined in regard to two different objects, which is apparent from the surrounding SFs. Therefore in this exemplary case, two intersection tests with O1 and O2 will disclose the fact that the HIP is not shadowed. In general, a case of uncertainty occurs when stencil fragments that surround a hit point are shaded by different objects, therefore the HIP maybe either shadowed by one of these objects, or can fall inbetween, illuminated by the LS. By use of volumetric stencil maps and by consequent intersection tests the shadowing status of a HIP can be always accurately and correctly defined. These intersection tests are focused on a specific object, instead of testing multiple objects on the way to the object. Intersection tests are unnecessary when all shadowed SFs, surrounding a HIP, include the same object, or all SFs are not-shadowed.

All the relevant volumetric information becomes available locally. When fragments are organized in cells, each cell is an autonomic processing entity, holding all the data required for local processing. The cell becomes independent of other cells as well free of processing order. As a whole, the assembly of autonomous cells creates an improved environment for a distributed parallel processing. It should be noted that in contrast to prior art, where expensive traversals of external acceleration structures must be conducted seeking candidate objects for intersection tests, here all the candidate objects are locally given in SFs. Our stencil map method excludes the need of expensive acceleration structures.

Figure 4A:
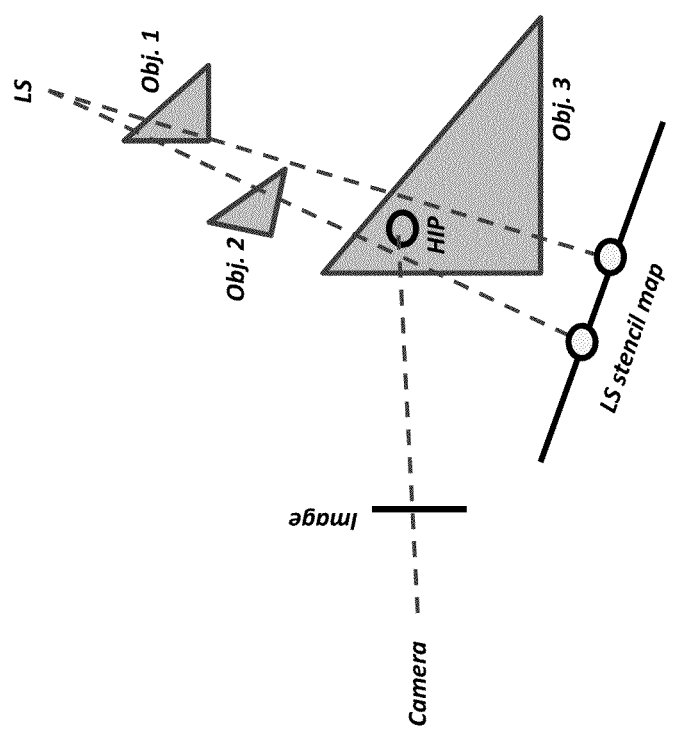
FIG. 4A. A setup of hit point (HIP), light source, objects and stencil map.
Figure 4B:
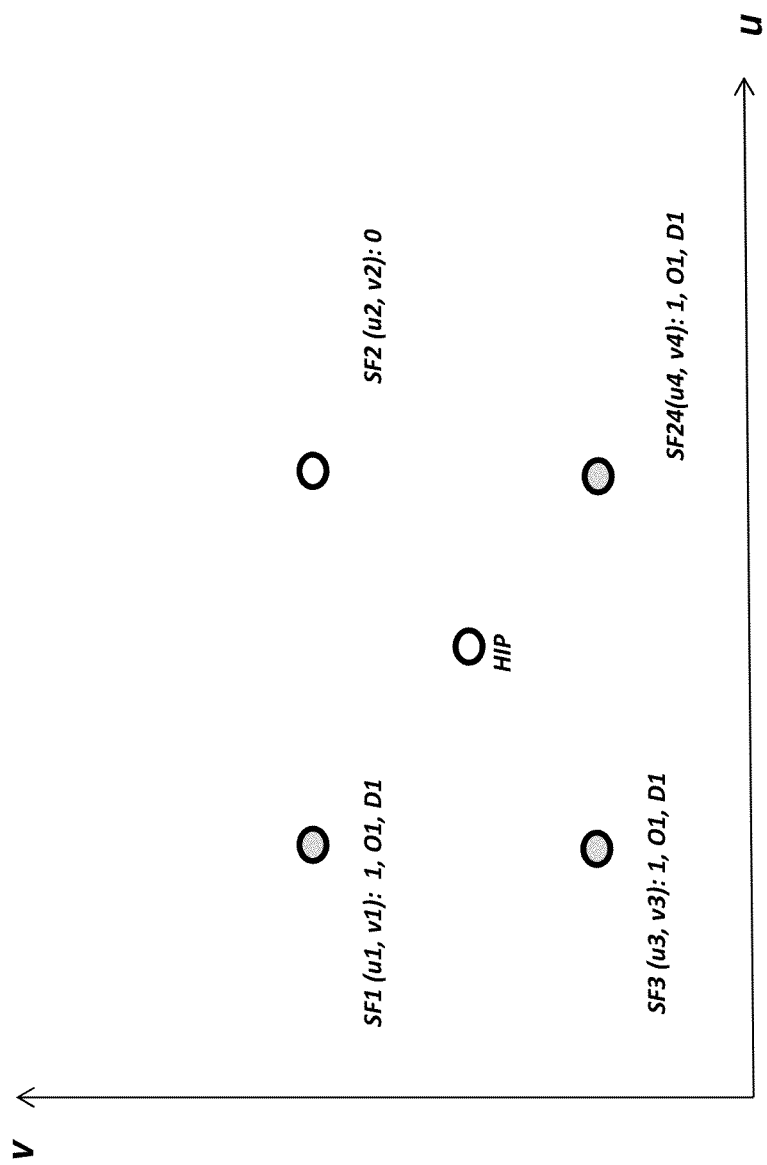
FIG. 4B. The shadow status of a visible intersection point can be interpreted from its surrounding stencil fragments.

FIG. 4A illustrates an environment of the stencil. We assume that the hit point (HIP), has been created either by the primary shooting stage as one of the camera visible points of the object (Obj. 3), or by secondary ray tracing stage. The primary shooting can be done either by scanline rendering (using Z-buffering) or by ray tracing. Scanline rendering is faster than ray tracing. For simplicity, we call them HIP in general. The created HIPs must be further processed for shadowing. The light source (LS) might be blocked by one of the potentially obstructing objects, Obj. 1 and Obj. 2. Shadowing decision is made up based on the information that resides in the stencil fragments surrounding the HIP:

1. Stencil fragment's illumination status. E.g. "0" for illuminated, "1" for shadowed
2. A list of all blocking objects between the LS and the fragment
3. A surface hit point (distance from LS) for each blocking object A fragment can be either illuminated or shadowed. It holds a list of all obstructing objects on the way to LS. The four stencil fragments surrounding the HIP, as shown in FIG. 4B, hold all relevant information required for finding out the shadowing status of the HIP. These neighboring stencil fragments are selected according to their u, v vicinity to the HIP, and the shadowing status (shadowed, non shadowed) of the HIP is set according to surrounding fragments' illumination status and the relative depth of fragment cached objects. In the given example three of the SFs are shadowed and one illuminated. The way of analysis for HIP shadowing will be explained hereinafter. In case that the above information is not adequate for a decisive answer, and the result is not definite, intersection tests with candidate objects must be conducted.

Three simple cases are illustrated in FIGS. 5A, 5B and 5C. The upper part of FIG. 5A shows the HIP, light source (LS), blocking object O1, and neighboring stencil fragments (SF). The lower part shows the HIP and four neighboring SFs, all of them caching the same object O1. The shadowing solution for HIP is therefore straightforward; it is shadowed by O1. No intersection is needed. The resolution of the stencil map must be close to the resolution of the image such that the smallest object couldn't disappear between neighboring stencil fragments. This is true also in the case of FIG. 5B. The setting is as before, but without blocking objects. Assuming a correct resolution of the stencil map, the empty list of objects in all SFs can be interpreted as a non shadowed HIP. This is a trivial case with no need to examine objects in SFs. No intersection is needed in this case as well. In contrast to the last two cases, FIG. 5C describes a case calling for an intersection test. Two of SFs are blocked by obstructing objects, while the two others are free. The shadowing status of HIP is therefore unclear, and the only solution is to perform an intersection test with the object O1.

Figure 6D:
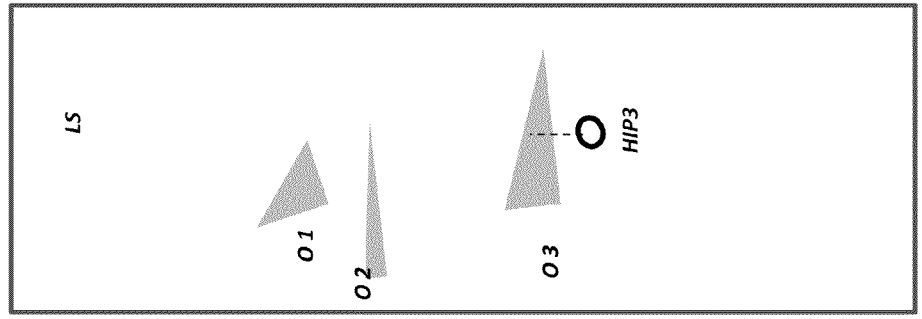
FIG. 6D. Shadowed HIP, no intersection test.
Figure 6C:
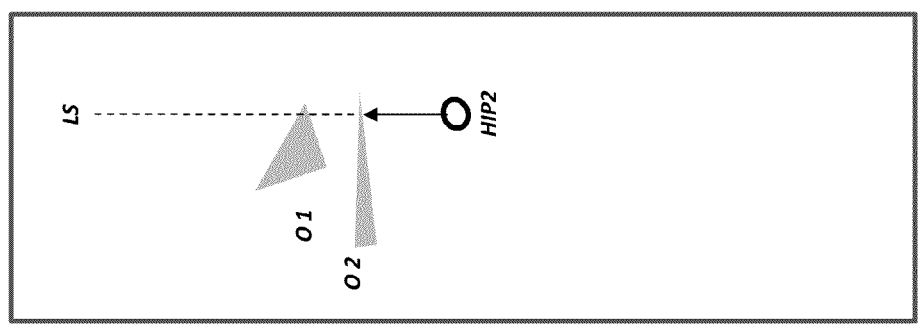
FIG. 6C. Shadowed HIP, intersection test is needed.
Figure 6B:
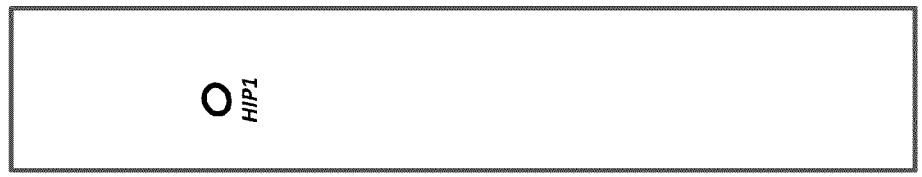
FIG. 6B. Non-shadowed HIP, no need to make intersection test.
Figure 6A:
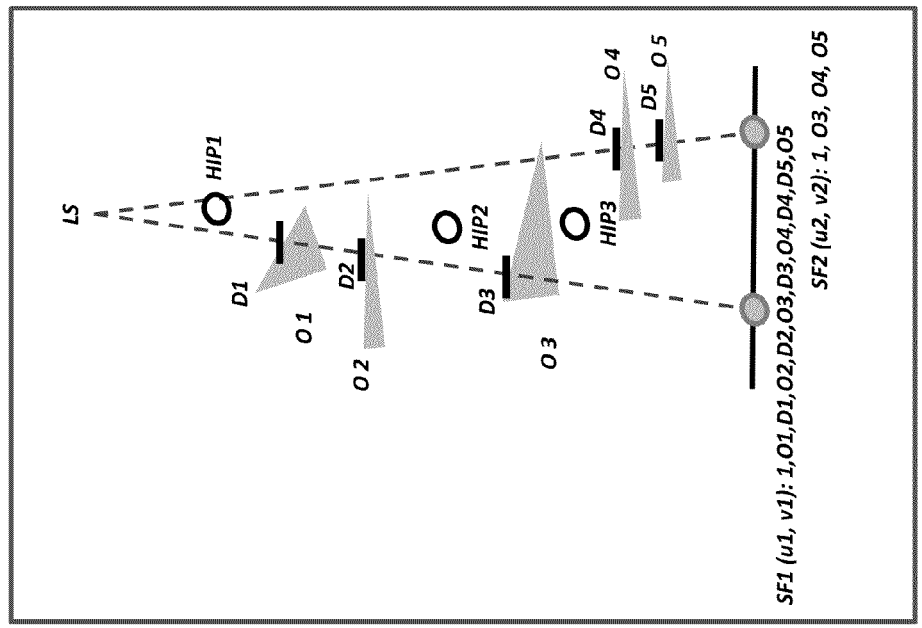
FIG. 6A. A setup of three HIPs, scene objects and two stencil fragments.

Multiple SPs located between the same four SFs, but having different depth values, may yield a different shadowing results. This is illustrated in FIGS. 6A to 6D, for three different HIPs. In FIG. 6A a set of three HIPs of different depths is shown. All three are located between the same two (instead of 4, for the sake of simplicity) SFs. FIG. 6B relates to HIP1. None of SFs objects are of a lower depth value than HIP1, meaning that HIP1 must be illuminated. This is not a trivial conclusion, since it is based on examination of all objects cached in SF1 and SF2. However the intersection test is eliminated. FIG. 6C, relating to HIP2, shows that two of the objects cached in SF1 are of a lower depth than SP1, while there are no objects registered in SF2. HIP1 can be, or can be not blocked by one or more of the SF1 objects. Therefore the intersection test is required. The third HIP, shown in FIG. 6D, is blocked by object O3 repeating in both SFs and having a smaller depth value, meaning that SIF3 is shadowed by O3. This is not a trivial conclusion as well, since it is based on examination of the objects cached in SF1 and SF2. No intersection test is required.

Figure 7B:
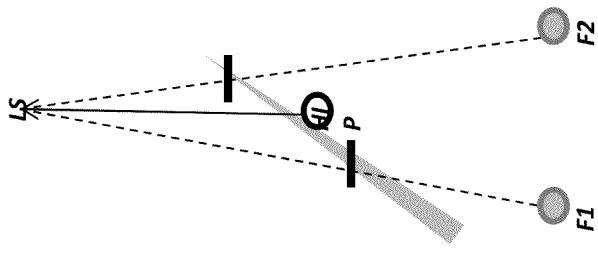
FIG. 7B. Similar ambiguous case. Shadowed. Needs intersection test.
Figure 7A:
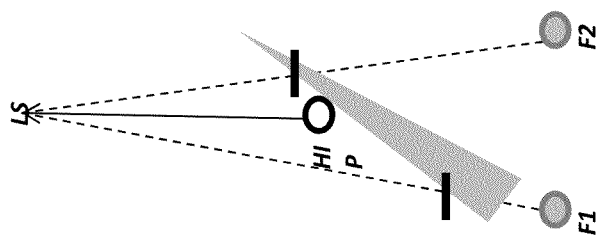
FIG. 7A. Ambiguous case. Non shadowed. Needs intersection test.

Two interesting cases calling for intersection tests are shown in FIGS. 7A and 7B. In both cases there is one object that is partly above and partly below the HIP. In FIG. 7A the HIP remains non shadowed, while in FIG. 7B it is shadowed. In such a case a solution can be found by intersection test only.

Figure 8:
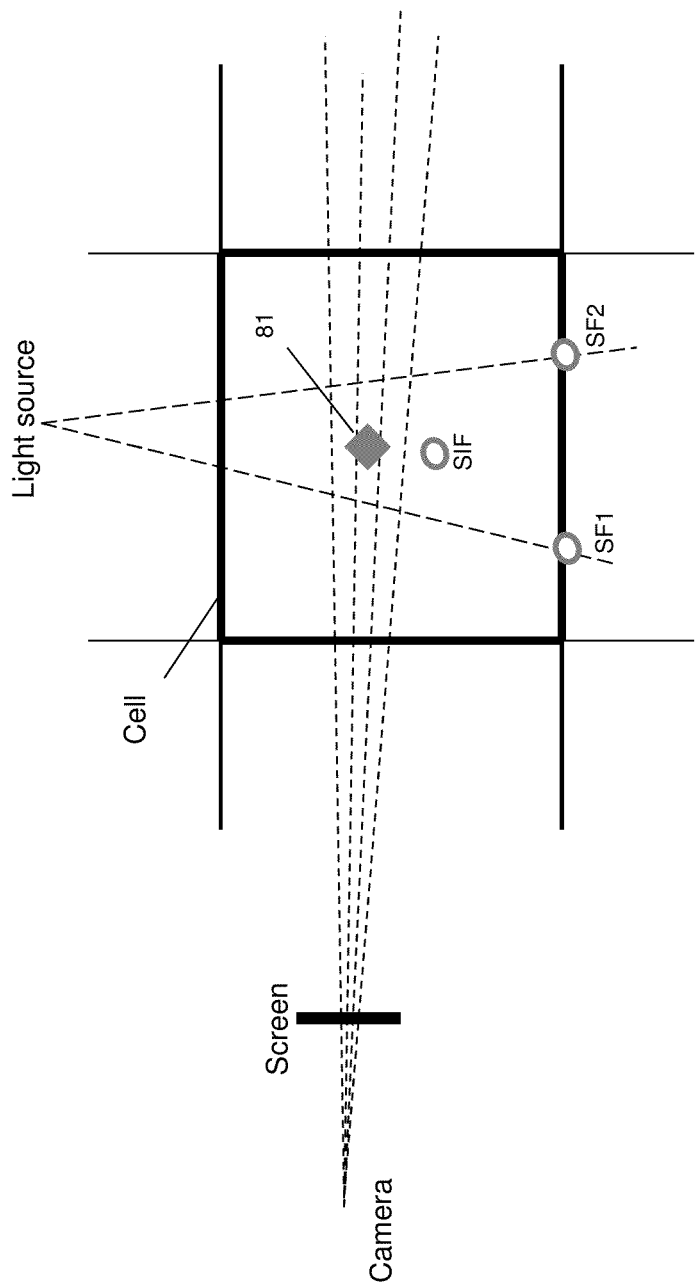
FIG. 8. Small objects that tends to disappear from the stencil map due to improper resolution.

In ray tracing the image resolution on the screen converts into the spatial shooting resolution at the scene space. This spatial resolution varies from cell to cell, according to the cell distance from the screen. The stencil map resolution, on the other hand, depends on the cell distance from the light source. There is no natural link between these two resolutions. However, if the resolution of the stencil map of a cell is too low, SFs would have insufficient volumetric information for the SIFs, causing an incorrect shadowing. If the resolution of SFs is significantly lower than that of shooting rays resolution, object information tend to disappear. This may become evident from the example of FIG. 8, where the stencil resolution is about ½ of that of shooting. The HIP resides amid SFs that are not shadowed. There is a tendency for small objects to disappear from the stencil, despite being visible to shooting rays. Object 81 is visible from the camera, but invisible from the light source, therefore an intersection test must be performed.

On the other hand, when the resolution is correct, this case becomes trivial, without intersection tests or even without examining the SFs registrar. Unfortunately, the case when all neighboring SFs are not shadowed is quite abundant. Consequently, a preferred embodiment includes matching the stencil resolution at each cell to that of shooting. Nevertheless, another embodiment is possible that would call for a single stencil map for all cells, a less expensive one in terms of stencil generation, but at the cost of a less efficient runtime shadowing algorithm.

Figure 9:
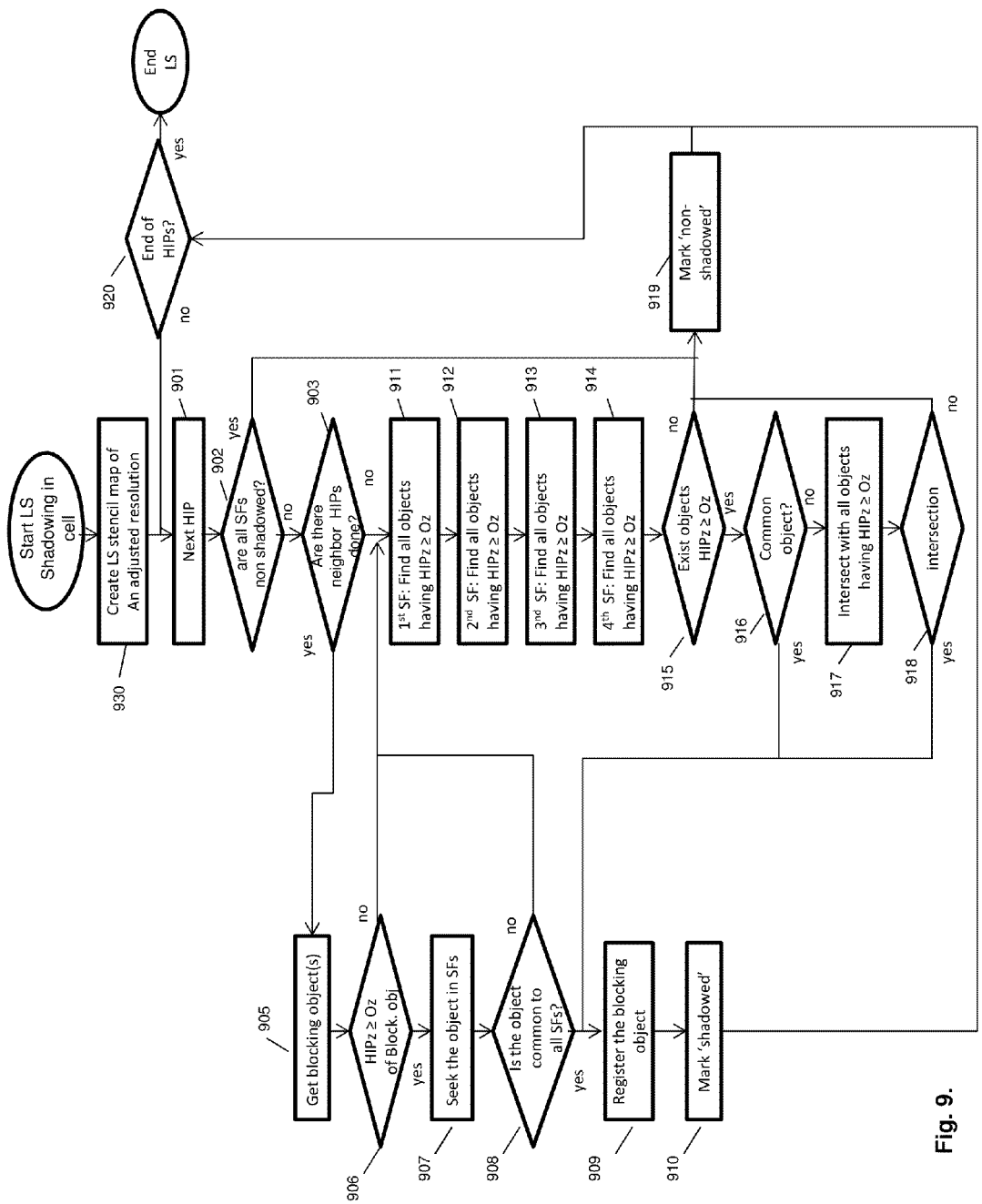
FIG. 9. Algorithm flowchart of stencil shadowing.

The shadowing flowchart in a cell is given in FIG. 9. A stencil map is generated from an LS, in a resolution adjusted to that of shooting 930. In a case of triangle based scene data, the preferable way to create the stencil map is by a GPU graphics pipeline with a modified shader code. The data base of scene triangles between the LS and the cell would consist the input to this task. In a next step 901 a HIP is taken for shadowing. First 902 a test for the simplest case of a non-shaded surrounding SFs is done, by testing the shadow bit B at each SF. If the test comes positive, the HIP is marked 'non-shadowed' 919 and next HIP is taken. Otherwise 903, a try is done for object coherency. If neighboring HIPs, one or more, have been already processed finding the shadowing object, there is a good probability that the current HIP is obstructed by the same object as well. Therefore, testing this object first may save the time of testing multiple objects in surrounding SFs. Each HIP that has been done for shadowing, and found shadowed, keeps the ID of 'blocking object' as parameter. Then the 'blocking object' of one or more HIPs is read 905, and its depth (distance from an LS) is compared with current HIP's depth 906. If the comparison result is negative, the process returns to main thread. If positive, the object ID is searched for in surrounding SFs 907. The current HIP is certainly shadowed only if that object's ID is found in all surrounding SFs 908, then the ID is kept in HIPs registry 909 and the HIP is marked as 'shadowed' 910 and next HIP is taken.

If in all cases the coherency fails, the main thread is taken, 911-914, where the depth of cached objects of all 4 SFs is compared with the current HIP. If a common object is found in all SFs 915, having a smaller or equal depth, that object's ID is kept in HIPs registry and the HIP is marked for 'shadowed'. Otherwise, if such an object wasn't found, an intersection test with all objects of a smaller depth must be done 917. If an intersection was found, the intersected object's ID is kept and the HIP is marked for 'shadowed'. When intersection tests fail, the HIP is marked for 'non-shadowed' 919, and next HIP is taken.

Performance Comparison: Stencils vs. Prior Art

Our performance analysis is based on model developed by Vlastimil Havran (*Heuristic Ray Shooting Algorithms*, Czech Technical University, Prague, 2000, p. 24).

$$T_R = (N_{TS} * C_{TS} * N_{IT} * C_{IT}) * N_{rays} + T_{app} = (\text{cost of traversal} + \text{cost of intersection}) * N_{rays} + T_{app}$$

$N_{TS}$ Average nodes accessed per ray $C_{TS}$ Average cost of traversal step among the nodes (incl. mem. access)

$N_{IT}$ Average number of ray-object intersection tests per ray $C_{IT}$ Average cost of intersection test $T_{app}$ Remaining computation (same for all algorithms)

The performance model separates the cost of ray traversal and the cost of intersection tests.

The last element $T_{app}$ consists of shading and other remaining computations. Since it is the same for all algorithms, it is not part of our performance comparison.

Havran's model is applied first to a prior art algorithm and then modified and applied to our stencil based algorithm. The following ray tracing system is assumed:

A scene is subdivided into grid of $43^3$, having in total 79,507 uniform cells.

The scene data comprises 1,280,000 triangles with a uniform distribution of 10 triangles/cell.

The number of shooting rays is 4,000,000.

A single light source is considered.

In prior art shadowing a global KD-tree is used, and each cell is further subdivided into grid of $2^3$ sub-cells, to be solved by a small local KD-tree.

$C_{TS}$=0.3 traversal step for a big global KD-tree (according to Havran)

$C_{TS\_local}$=0.1 traversal step for a small local KD-tree (an approximation)

$C_{IT}$=0.7 (according to Havran).

$N_{IT}$=2, two intersection tests per cell, on average.

50% of rays hit objects. Each hitting ray generates one shooting intersection point (SIP). Therefore the amount of shooting intersection points #SIP=2,000,000. No intersection points of bouncing rays are assumed.

We assume that 50% of #SIP are shadowed.

An average distance between a SIP and a light source is 34 cells. Therefore the average number of traversed cells/nodes before a hit is determined is: $N_{TSG}^{hit}$=17 cells. In case of no hit $N_{TSG}^{no\ hit}$=34 cells.

Along the path of 34 or 17 cells, 2 local intersection tests per cell are done on average. $N_{IT}$=2.

An average number of local nodes accessed: $N_{TSL}$=6

Prior Art Shadowing Performance

Havran's model is applied to prior art shadowing in the following way:

$$T_{shadow} = [\text{Global\_traversals} + \text{Local\_traversals} + \text{Intersection\_tests}]^{hit} +$$
$$[\text{Global\_traversals} + \text{Local\_traversals} + \text{Intersection\_tests}]^{no\_hit}$$
$$= N_{TSG}^{hit} * C_{TS} * \#SIP_{hit} + N_{TSG}^{hit} * (N_{TSL} * C_{TS-local}) * \#SIP_{hit} +$$
$$N_{TSG}^{hit} * (N_{IT} * C_{IT}) * \#SIP_{hit} +$$
$$N_{TSG}^{no\ hit} * C_{TS} * \#SIP_{no-hit} + N_{TSG}^{no\ hit} * (N_{TSL} * C_{TS-local}) * \#SIP_{no-hit} +$$
$$N_{TSG}^{no\ hit} * (N_{IT} * C_{IT}) * \#SIP_{no-hit}$$
$$= \#SIP_{hit} * N_{TSG}^{hit} (C_{TS} + N_{TSL} * C_{TS-local} + N_{IT} * C_{IT}) +$$
$$\#SIP_{no-hit} * N_{TSG}^{no\ hit} (C_{TS} + N_{TSL} * C_{TS-local} + N_{IT} * C_{IT})$$
$$T_{shadow} = 2,000,000 * 17 * (0.3 + 6 * 0.3 + 2 * 0.7) + 2,000,000 *$$
$$34 * (0.3 + 6 * 0.3 + 2 * 0.7)$$
$$= \underline{357,000,000}$$

Out of the total time $T_{shadow}$ the intersection tests take 142,800,000 units.

Performance of Stencil Based Shadowing

First we modify the previously used shadowing model to be applied to the stencil algorithm. All KD-tree traversal elements are replaced by testing the neighboring stencil fragments (SF). There are basically 4 testing steps:

1. Neighboring test 1 (NT1). All surrounding SFs of the analyzed SIP are checked for being not shadowed. Following our assumption that 50% of SIPs are illuminated, we assign 40% of all cases to NT1, and assign the cost of $C_{NT1}$=0.01 to this trivial task.
2. Neighboring test 2 (NT2). Neighboring SIPs are checked for object coherency. If neighboring SIP(s) is found shadowed, the same shadowing object is checked first for obstructing the current SIP.
3. Neighboring test 3 (NT3). A common obstructing object is looked for in all the four surrounding SFs. We assign an estimated cost of $C_{NT(2-3)}$=0.05 to steps 2 and 3.
4. Actual intersection. Finally, if none of the above steps harvests a definite result, an intersection test with SFs registered objects is performed. While the tasks 1-3 are based on integer arithmetic, the intersection is a floating point task. The cost of the last task is comparable to the cost of actual intersection tests of prior art, $C_{IT}$=0.7. The equation becomes as follows:

$$T_{shadow} = [NT1]^{no\_hit} + [NT1 + NT(2\ \&\ 3) + \text{Intersection\_tests}]^{no\_hit} +$$
$$[NT1 + NT(2\ \&\ 3)]^{hit} + [NT1 + NT(2\ \&\ 3) + \text{Intersection\_tests}]^{hit}$$
$$= 800,000 * C_{NT1} + 200,000 * (C_{NT1} + C_{NT(2-3)} + 34 * 2 * C_{IT}) +$$
$$500,000 * (C_{NT1} + C_{NT(2-3)}) +$$
$$500,000 * (C_{NT1} + C_{NT(2-3)} + 17 * 2 * C_{IT})$$
$$= \underline{21,460,000}$$

The Result:

Table 1 summarizes the performance of stencil based shadowing vs. prior art shadowing. Rows 3-4 of the table are analytically calculated, following Vlastimil Havran's model. They compare the costs of frame preprocessing and shadowing. The total time our stencil based shadowing takes is only 4.7% of that of prior art, and intersection tests account to 7.3% of those of prior art.

The second row shows the reduction of intersection tests, as measured on a conference scene.

This scene is used as a benchmark by many ray tracing researchers. The comparison was made with the popular Blender ray tracer. Both were run on a single CPU.

TABLE 1

|  | Prior art (Blender) | Stencil based shadowing | Advantage |
|---|---|---|---|
| Total intersection tests | 100% | 7.3% | x 13.7 |
| Frame preprocessing (analytically calculated*) | 42M | 4M | X 10.5 |
| Shadowing cost (analyt. calculated) | | | |
| Traversals | 12M | 0 | X 21.5 |
| Intersec. tests | 30M | 1.95M | |

Implementation Embodiments

Figure 10:
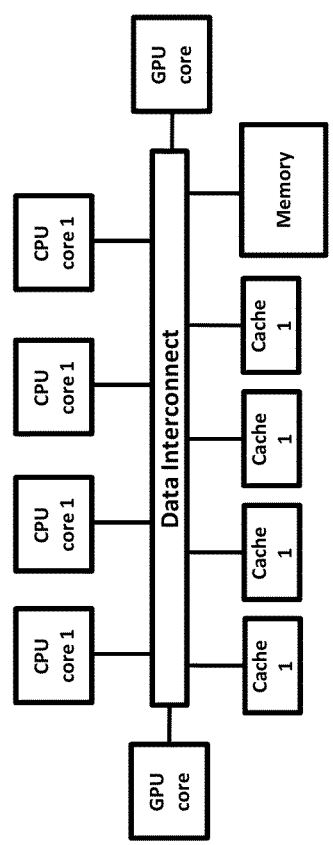
FIG. 10. A schematic block diagram of a shared memory and shared caches multiprocessing architecture.

Our algorithm based on stencil can be efficiently implemented on a single processor systems, as well as on multiprocessor systems, general purpose processors, special purpose processors, multicore processors, and GPUs. These processors can be integrated in different computing systems such as single processor computing systems, parallel computers, PC-level computers, information server computers, cloud server computers, laptops, portable processing systems, tablets, Smartphones, and other computer-based machines. Although a sequential computing system is capable of performing our shadowing algorithm, however, parallel computing system would do it for larger models. Today, a typical classification by model size is to small models of up to few hundreds of polygons, medium models of up to a few millions of polygons, and large models of up to billions of polygons. Due to our enhanced load balancing, the performance scalability is linear to the number of participating processors. The multiple processors of a parallel system can share a single 'shared' memory, typically for small or medium models, when the model resides in a single memory shared by all processors. For large models the multiple processors of a parallel system would preferable have private memories, so called distributed memory parallel computing systems, when the large model is distributed among the memories, and each processor has a sole access to its private memory. An exemplary schematic description of a shared memory parallel system competent to efficiently run our stencil based algorithm is depicted in FIG. 10. There are four processors, four shared caches, two GPUs and one shared memory. Preferable, the GPU can be utilized for creation stencil maps, due to the built in efficiency of a graphics pipeline to process a stream of polygons. The HIPs can be generated by CPUs, GPUs, or by different ways of coprocessing between CPUs and GPUs. They could be the product of a primary shooting stage, as well as secondary ray tracing stage as mentioned hereinbefore. Each cell is processed in an entirely independent way, generating a completely shadowed data. Assuming a correct system design, the cache keeps all the required data for cell's activity, reducing possible cache misses.

Figure 11:
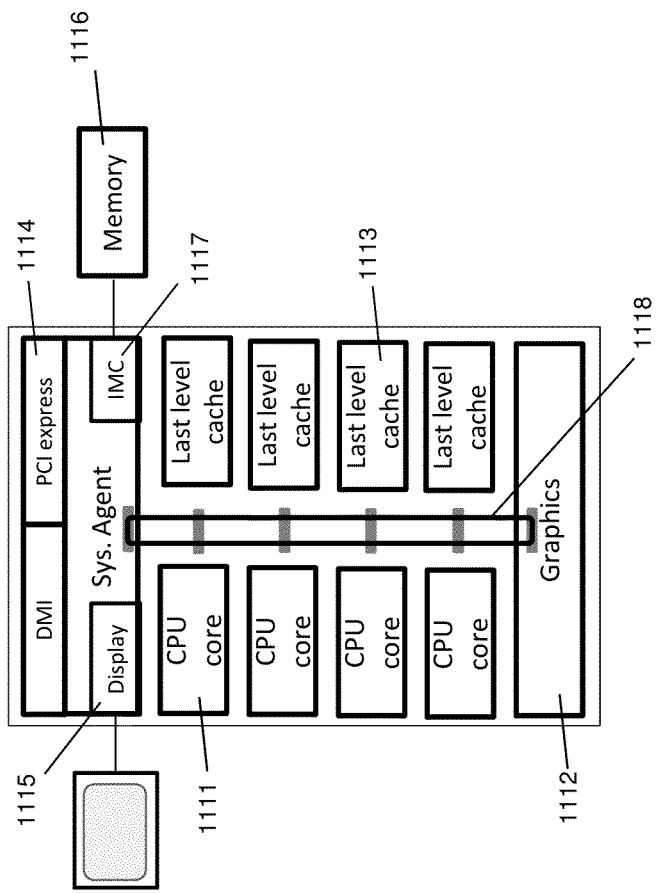
FIG. 11. A prior art multicore architecture.

Commercial parallel systems may offer advantages of lower cost and matured programming environment. One of such systems is a multi-core architecture by Intel, e.g. SandyBridge or IvyBridge. SandyBridge, as depicted in FIG. 11, comprises multiple CPU cores 1111, multiple cache memories 1113, pipeline-graphics core (one or more) 1112, ring type data interconnection 1118, display interface 1115, and PCI express interface 1114. This is a shared memory parallel system, with no private memories, integrated by way of SOC (system on chip) technology (termed also 'multicore'), where the entire system resides on a single chip, and silicon constraints exclude constructing private memories on the chip. Therefore the main memory 1116 is external to the SOC and connected by an integrated memory controller IMC 1117.

Figure 12:
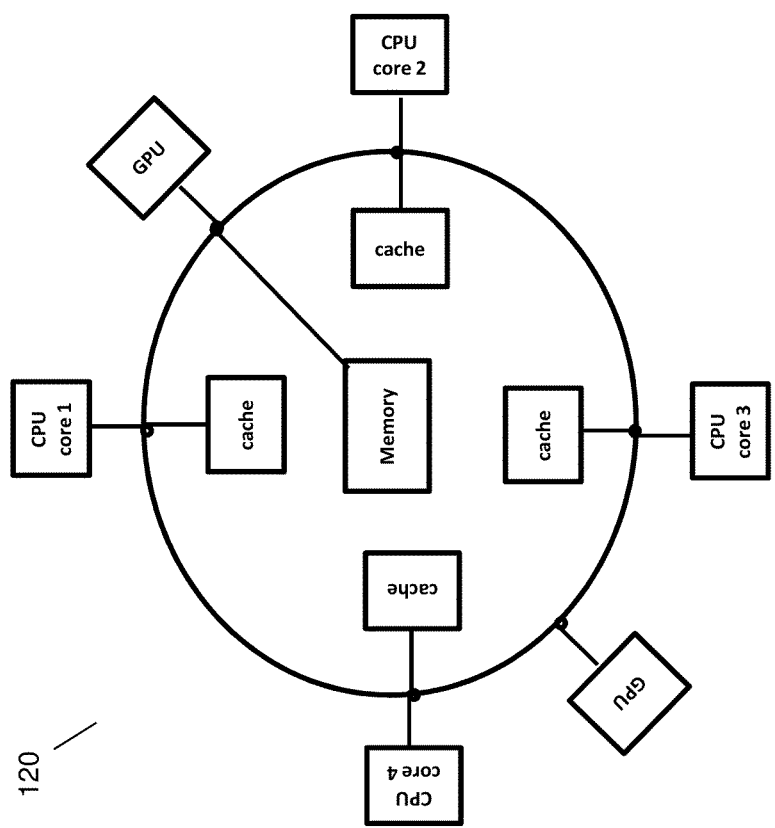
FIG. 12. Schematic description of a multicore based implementation.

An example of efficient implementation of our stencil based algorithm on a multicore system is shown in FIG. 12. The simplified schematic description includes four CPU cores, four shared caches, two GPU cores, data ring interconnection, and shared memory. The GPUs can be utilized for some parts of our stencil based algorithm, such as stencil map generation.

What is claimed is:

1. A shadowing method in a ray-tracing computing system, implemented on a 3D data of scene, having defined objects and light sources, comprising the steps of:
   A. during preprocessing on a multiprocessing system
      a. dividing the 3D data of scene into uniform grid of cells;
      b. mapping scene objects onto said grid of cells;
      c. for each light source in the scene
         i. registering all light occluding objects per each cell in a volumetric stencil map of raster fragments;
   B. during runtime on a multiprocessing system
      d. for each light source in the scene
         i. testing for shadow all hit points in each cell by analyzing fragments of the stencil map of raster fragments, said fragments surrounding a hit point;
         ii. performing intersection tests with light blocking objects in cases of uncertainty.

2. The method of claim 1, wherein volumetric stencil map registers multiple objects and their distances.

3. The method of claim 2, wherein the distances are taken from the light source perspective.

4. The method of claim 2, wherein the registered objects are light blocking objects.

5. The method of claim 1, wherein the information registered in a fragment comprises fragment's location, all light blocking objects and their depth.

6. The method of claim 1, wherein each hit point is surrounded by four fragments.

7. The method of claim 1, wherein case of uncertainty occurs when hit point surrounding fragments are shaded by different objects.

8. The method of claim 7, wherein intersection tests are done with the different objects.

9. The method of claim 1, wherein objects are polygons.

10. The method of claim 1, wherein objects are triangles.

11. The method of claim 1, wherein objects are geometric models.

12. The method of claim 1, wherein shadow stencils must be reconstructed only when there are changes in the scene or light sources.

13. The method of claim 1, wherein the data of a scene may be represented by a polygon model or by a geometric model.

14. The method of claim 1, wherein said stencil maps are projections of objects that block the light source.

15. The method of claim 1, wherein hit points are generated either by primary rays or by secondary rays.

16. The method of claim 1, wherein the resolution of stencil map is matched with the resolution of primary rays.

17. The method of claim 1, wherein all runtime shadowing tests are strictly local to a cell.

18. The method of claim 1, wherein the said method is implementable on a multiprocessing system selected from the group consisting of a PC-level computer, information server computer, cloud server computer, laptop, portable processing system, tablet, Smartphone, and any computer-based machine.

\* \* \* \* \*